Nov. 25, 1958 H. W. MADDEN 2,861,666
FLEXIBLE CAN STACKER
Filed July 22, 1957 6 Sheets-Sheet 4
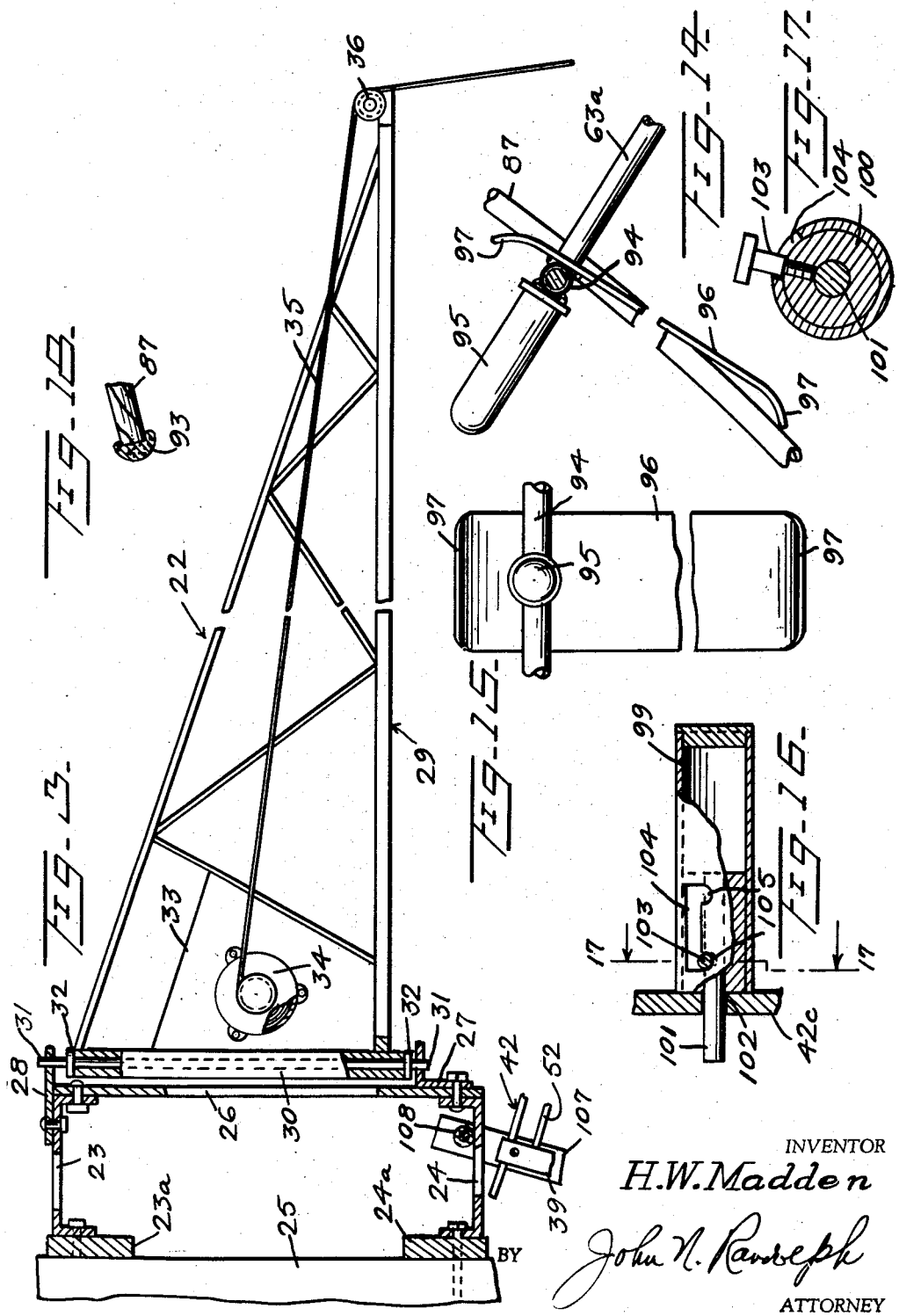
INVENTOR
H. W. Madden
BY John N. Randolph
ATTORNEY Nov. 25, 1958     H. W. MADDEN     2,861,666
FLEXIBLE CAN STACKER
Filed July 22, 1957     6 Sheets-Sheet 5
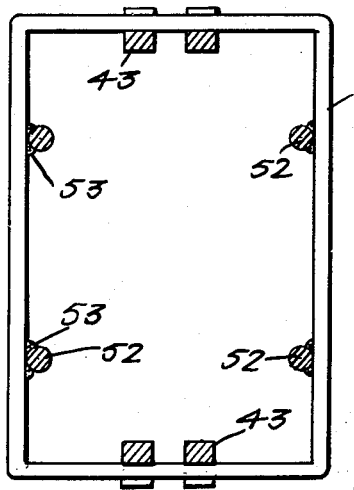
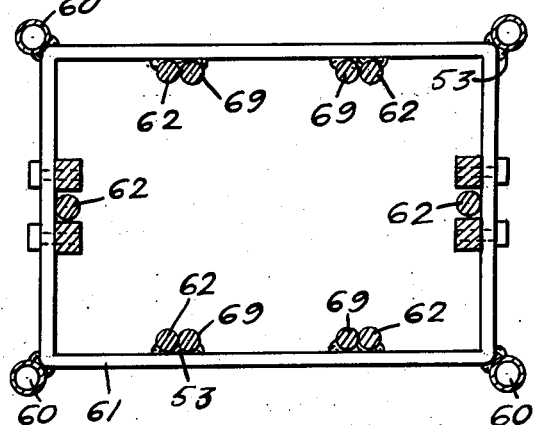
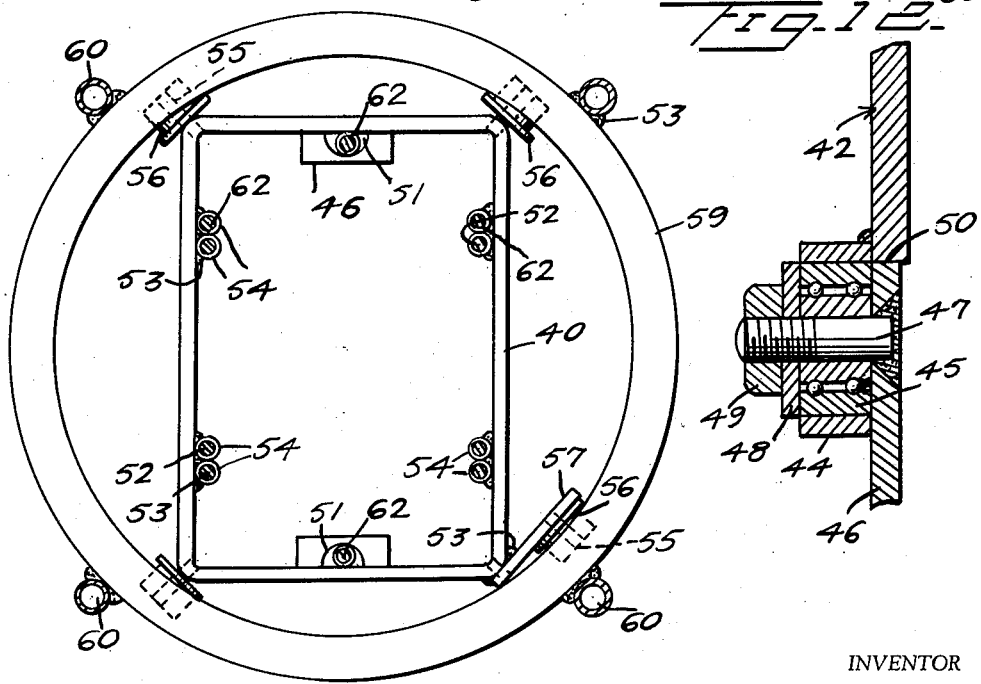
INVENTOR
H. W. Madden
BY John K. Randolph
ATTORNEY Nov. 25, 1958 H. W. MADDEN 2,861,666
FLEXIBLE CAN STACKER
Filed July 22, 1957 6 Sheets-Sheet 6
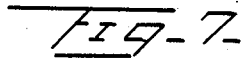
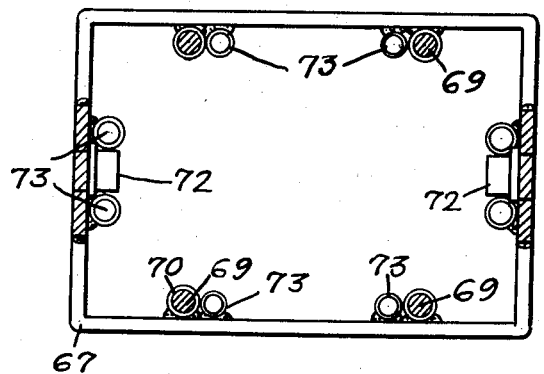
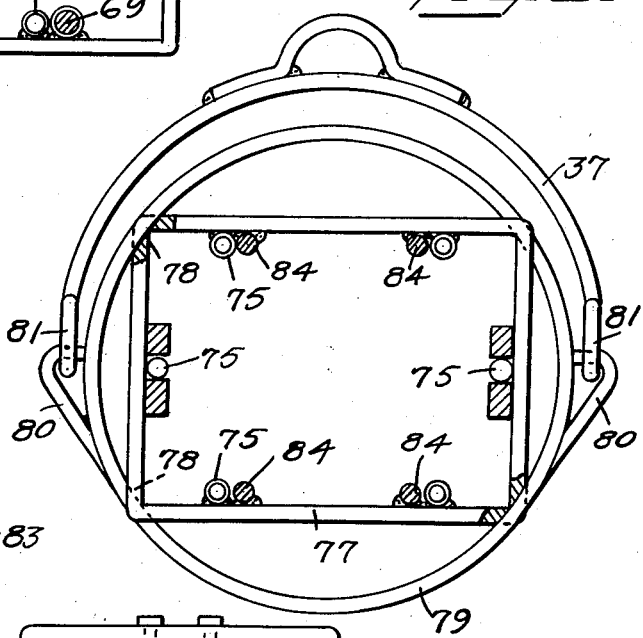
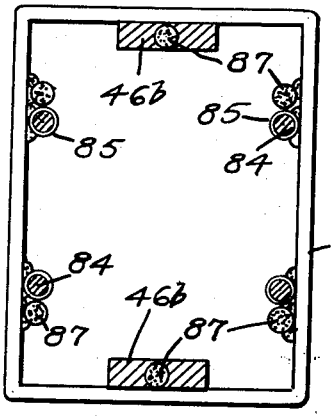
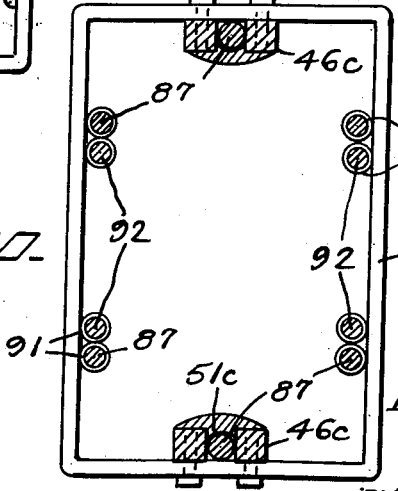
INVENTOR
H. W. Madden
BY John N. Randolph
ATTORNEY

United States Patent Office 2,861,666
Patented Nov. 25, 1958

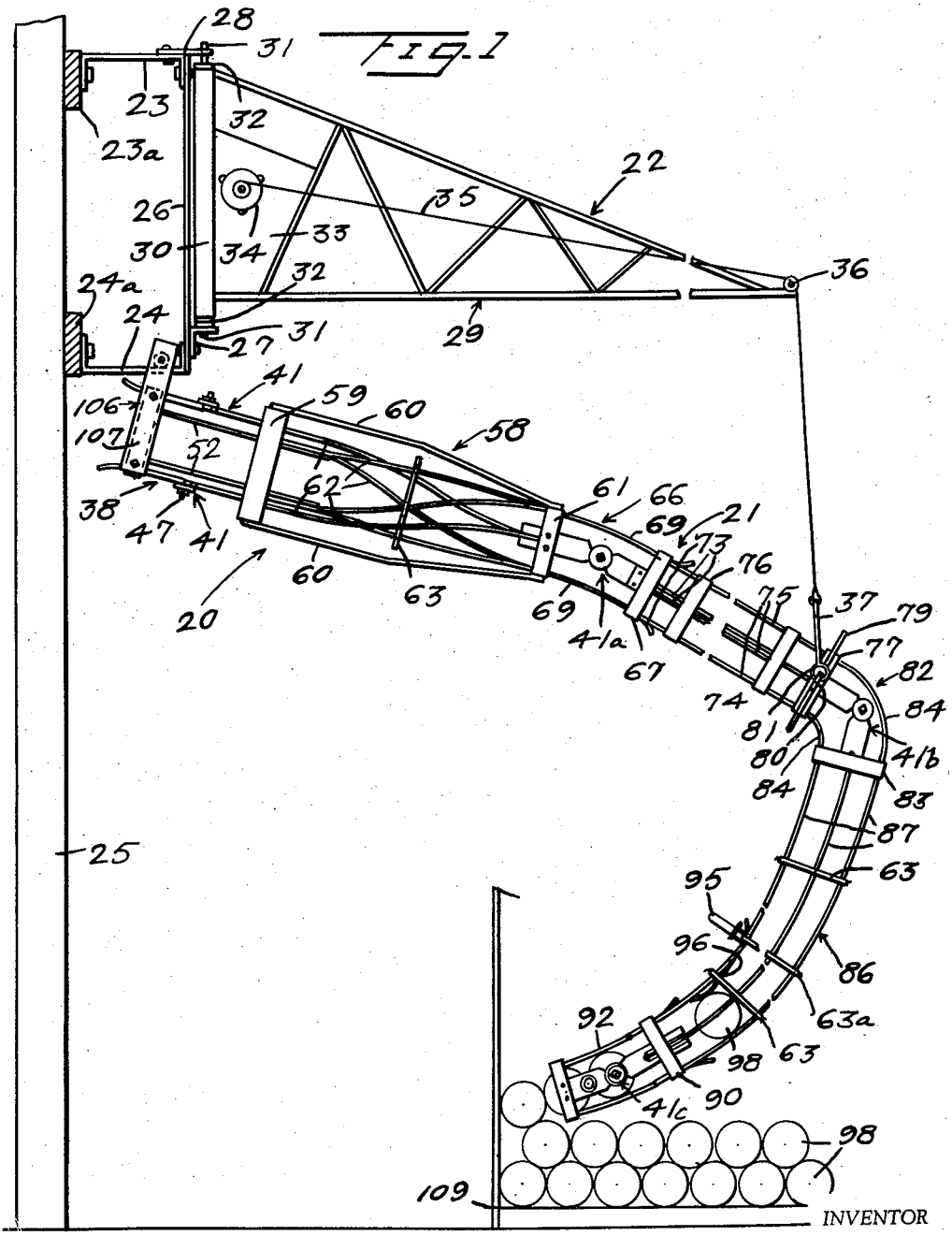

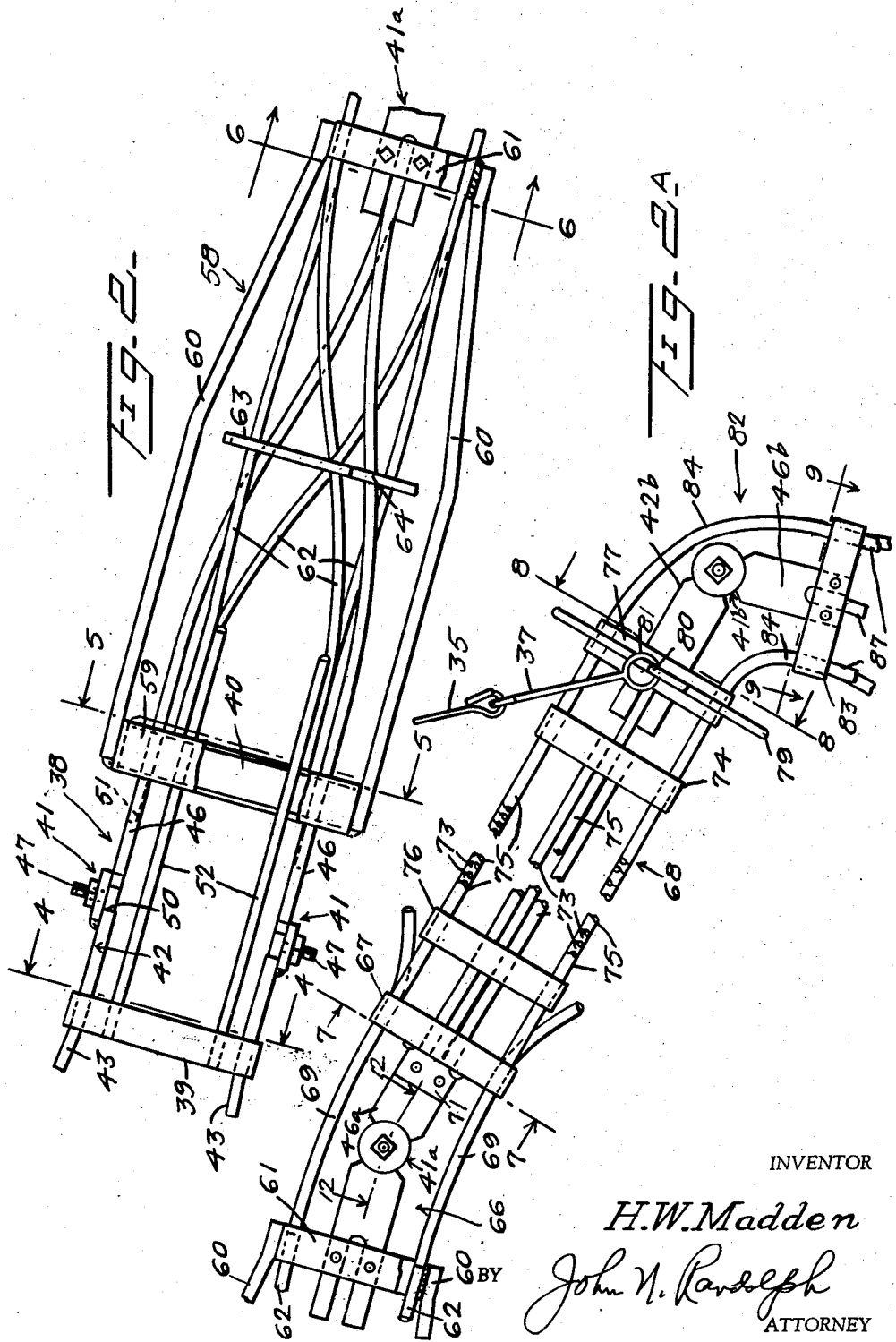

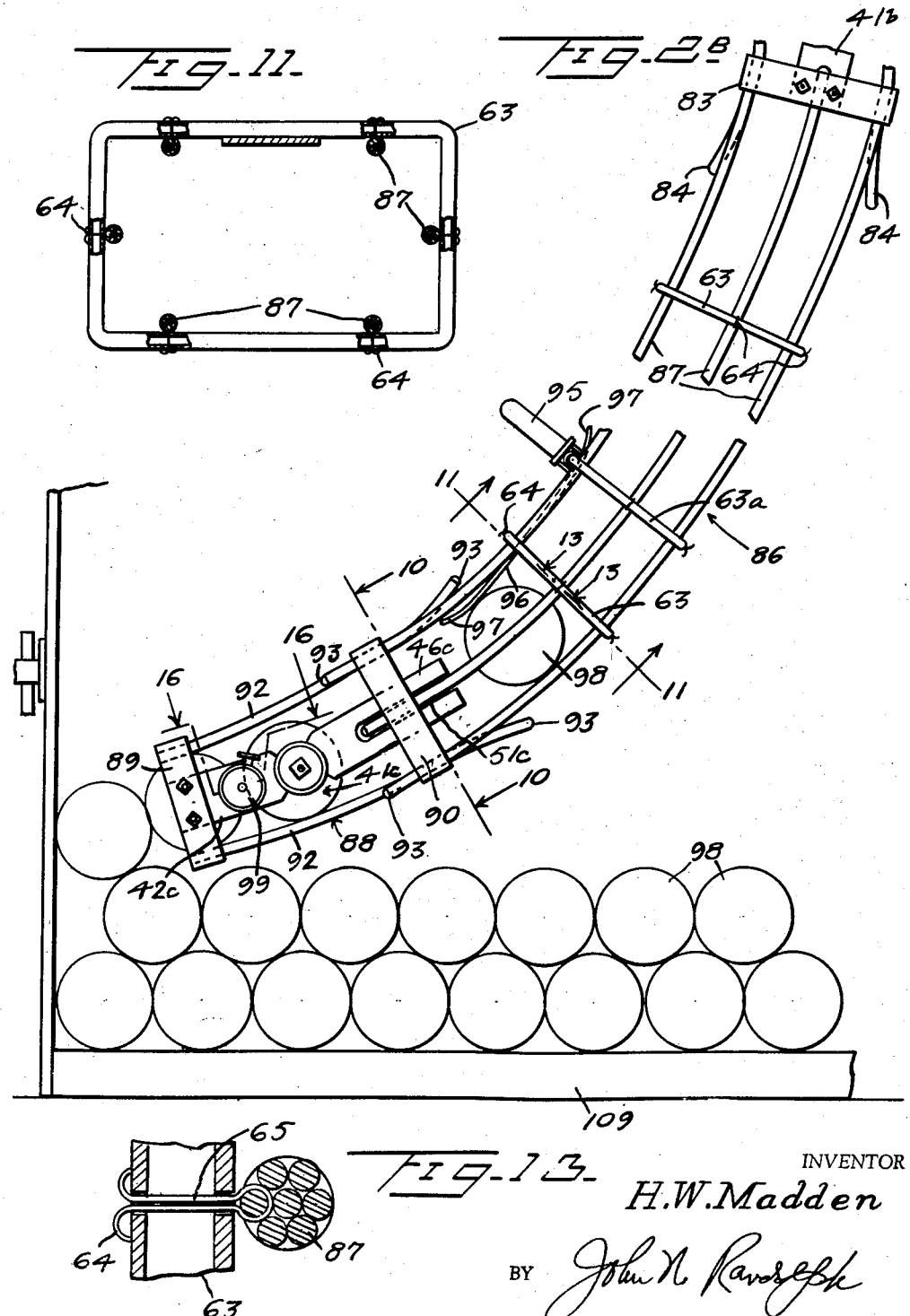

2,861,666

FLEXIBLE CAN STACKER

Homer W. Madden, Hanover, Ind.

Application July 22, 1957, Serial No. 673,330

18 Claims. (Cl. 193—16)

This invention relates to a flexible chute or conduit through which cans are fed by gravity to a discharge end of the chute from which the cans are released and simultaneously stacked by manipulation of said discharge end and the remainder of the chute.

More particularly, it is an aim of the present invention to provide a chute into which the cans are supplied in upright positions and wherein the cans are turned through an arc of approximately 90° to a horizontal position so that the cans will thereafter roll freely through the chute to the discharge end thereof.

A further object of the invention is to provide a can stacking chute having a plurality of flexible joints enabling the chute to swing about both horizontal and vertical axes to position the discharge end of the chute in a desired position for dispensing the cans.

Still a further object of the invention is to provide a can stacking chute which is extensible and retractable enabling cans to be stacked in long rows where desired.

A further and primary object of the invention is to provide a can stacking chute having a flexible outlet end section which is capable of being freely swung back and forth enabling the cans to be discharged therefrom during swinging movement of the discharge section for rapidly stacking the cans in superimposed rows by a successively back and forth motion of the discharge end.

Another object of the invention is to provide a can stacking chute having a counterbalancing supporting means for substantially supporting the weight of the chute and its contents to minimize the actual labor involved in stacking the cans.

A further object of the invention is to provide a can stacking chute having manually operable brake and stop means for stopping and regulating the flow of the cans from the chute.

Other objects and advantages of the invention will hereinafter become more fully apparent from the following description of the drawings, illustrating a presently preferred embodiment thereof, and wherein:

Figure 1 is a fragmentary side elevational view of the flexible can stacker;

Figure 2 is a fragmentary side elevational view, on an enlarged scale relative to Figure 1, of the inlet end portion of the can stacker;

Figure 2A is a fragmentary side elevational view of the intermediate portion of the can stacker;

Figure 2B is a fragmentary side elevational view of the outlet end portion of the can stacker and showing a portion of a receptacle into which the cans are discharged;

Figure 3 is a fragmentary side elevational view, partly in vertical section, showing the boom and counterbalancing unit forming a flexible support for the can conveying chute;

Figures 4, 5 and 6 are enlarged cross sectional views taken substantially along planes as indicated by the lines 4—4, 5—5 and 6—6, respectively, of Figure 2;

Figures 7, 8 and 9 are enlarged cross sectional views taken substantially along planes as indicated by the lines 7—7, 8—8 and 9—9, respectively, of Figure 2A;

Figures 10 and 11 are enlarged cross sectional views taken substantially along planes as indicated by the lines 10—10 and 11—11, respectively, of Figure 2B;

Figure 12 is an enlarged fragmentary sectional view taken substantially along the line 12—12 of Figure 2A;

Figure 13 is an enlarged fragmentary sectional view, taken substantially along a plane as indicated by the line 13—13 of Figure 2B;

Figure 14 is a fragmentary longitudinal sectional view taken through a part of the outlet end portion of the chute;

Figure 15 is an elevational view looking from left to right of Figure 14;

Figure 16 is an enlarged fragmentary sectional view in detail, taken substantially along a plane as indicated by the line 16—16 of Figure 2B;

Figure 17 is a cross sectional view taken substantially along a plane as indicated by the line 17—17 of Figure 16, and Figure 18 is an enlarged fragmentary side elevational view of a cable end.

Referring more specifically to the drawings, the flexible can stacker in its entirety and comprising the invention is designated generally 20 and includes a flexible and extensible can conveying chute, designated generally 21, and a counterbalancing support for said chute, designated generally 22.

The support 22 includes upper and lower bracket arms 23 and 24 which are fixed to and extend outwardly from horizontal supporting bars 23a and 24a, respectively, which may be suitably mounted in an overhead or elevated position and in vertically spaced relation to one another, as by being secured to and extending laterally from an upright support or standard 25 (Figures 1 and 3). A bar 26 extends between and is secured at its ends to angularly turned ends of the bracket arms 23 and 24. The bar 26 supports a lower angular journal member 27 and an upper journal member 28 is secured to and extends outwardly from the upper bracket arm 23. A boom 29 has an enlarged inner end 30 in the form of a tube or sleeve from the ends of which project shaft portions 31 which turnably engage in the journal elements 27 and 28, by means of which the boom 29 is supported to swing through an arc of approximately 180° in substantially a horizontal plane. The shaft ends 31 may carry suitable antifriction bearing means 32 to insure a free swinging movement of the boom 29. A plate or web 33 is mounted in the enlarged inner end of the bom 29 and is disposed in the plane thereof to provide a support for a conventional balancer 34. A cable 35 is wound in the balancer 34 and has an end extending therefrom longitudinally toward the restricted outer end of the boom 29. The cable 35 passes over a sheave or pulley 36 which is supported by the outer end of the boom 29 and the depending end of said cable 35 is connected to the intermediate portion of a bail 37, as seen in Figure 2A. The balancer 34 is of the adjustable type so that the tension or inward pull on the cable 35 can be varied, depending upon the load supported by said cable.

The can conveying chute 21 includes an inlet section, designated generally 38, which includes rigid rectangular end frames 39 and 40 which are connected flexibly to one another by knee joint units 41, each of the pair of which includes a bar 42 having a slotted outer end 43 which is secured to the inner face of one of the shorter sides of the frame 39 and which is flared outwardly therebeyond, as best seen in Figures 2 and 4. The other inner end of the bar 43 is provided with an outwardly offset ring 44 containing an antifriction bearing 45, as best seen in Figure 12. Each knee joint 41 includes a second bar 46 which is disposed in aligned end-to-end relationship with the bar 42. A bolt 47 projects laterally from the outer side of the inner end of the bar 46 and is journalled in the antifriction bearing 45 and has a threaded outer end on which is mounted a washer 48 and a nut 49 for assembling the knee joint bars 42 and 46 pivotally together. The bars 42 and 46 have conformably rounded abutting ends disposed on an arc about the bolt 47 as a center to permit said bars 42 and 46 to swing relative to one another, as seen at 50. The other end of the bar 46 is secured to the inner face of one of the shorter sides of the rectangular frame 40, as seen in Figure 5, and has a longitudinally extending groove 51 on the outer side thereof. The two knee joints 41 are disposed in opposed relation to one another with the axes 47 thereof in alignment to enable the ends of said inlet end portion 38 to flex relative to one another about the pivot axis 47. Said inlet portion 38 also includes four flexible cables 52. The cables 52 have corresponding ends secured, as by welding, as seen in Figure 4 at 53, to the inner faces of the longer sides of the frame 39, two cables 52 being secured to each of said longer sides. The longer sides of the frame 40 have sleeves 54 secured to the inner faces thereof and crosswise of the frame 40, as by welds 53, and in which portions of the cables 52 are slidably disposed. As seen in Figure 5, pins 55 project outwardly from three of the corners of the frame 40 to provide journals for rollers 56. An arm 57 is welded to and extends laterally from the other corner of the frame 40 and supports another outwardly extending pin 55 on which a fourth roller 56 is journalled.

A twist section, designated generally 58, constitutes an extension of the inner end of the inlet section 38 and includes an internally grooved ring 59 which is mounted on the four rollers 56. The roller 56 supported by the arm 57 is applied to the groove of the ring 59 after the other rollers are in engagement with said groove and the arm 57 is then welded as seen at 53 to the frame 40. The ring 59 is thus mounted to rotate or oscillate on the frame 40. A plurality, preferably four pipes 60 have corresponding ends secured by welds 53 to the exterior of the ring 59 at equally spaced points thereabout. Opposite inwardly offset ends of the pipes 60 are secured by additional welds 53 to the exterior of four corners of a frame 61, which defines the opposite end of the twist section 58, and which corresponds substantially to the frames 39 and 40. Corresponding ends of six cables 62 are secured by welding 53 to the inner faces of the sides of the frame 61, one to each of the two shorter sides and two to each of the two longer sides. The cables 62 extend from the frame 61 toward the frame 40. Opposite end portions of the cables 62 of the longer sides slidably engage additional sleeves 54 of the longer sides of the frame 40 and the cables 62 of the shorter sides slidably engage in the grooves 51. It will thus be seen that the frame 40 also constitutes a part of the twist section 58. A rectangular spacing frame or spacer 63 is disposed around the intermediate portions of the cables 62. As best seen in Figures 11 and 13, a cotter pin 64 is provided for each of the six cables 62. Each cotter pin engages one strand of the cable to which it is connected and the legs of the cotter pin extend outwardly through an opening 65 of the spacer 63 and are bent outwardly for anchoring the cotter pin to the spacer. Thus, the six cables 62 are connected to the spacer 63 in correctly spaced apart relation to one another to prevent collapsing of the cables between the frames 40 and 61. The rigid frame structure formed by the ring 59, pipes 60 and frame 61 can be rotated 90 degrees in either direction about the frame 40 to produce a 90 degree twist in the flexible conduit portion formed by the cables 62 between the ends 40 and 61 of the twist section 58, as clearly illustrated in Figure 2, so that whereas the longer axis of the conduit at the frame 40 is disposed substantially vertically, the longer axis of the conduit at the frame 61 is disposed in nearly a horizontal plane.

A knee joint section 66 is disposed between the end 61 of the twist section and an adjacent end 67 of an extensible and retractable conduit section 68. Said knee joint section 66 includes four cables 69, arranged in the same manner as the cables 52 and which are secured to the frame 61 and slidably mounted in tubes 70 carried by the frame 67, as best seen in Figure 7. The knee joint section 66 includes two knee joint units 41a which differ from the knee joint units 41 only in that the bars 46a thereof are fastened to plates 71 which are secured to and project from the shorter sides of the frame 67, and said bars 46a have restricted ends 72 which are disposed on the inner side of the frame 67. It will be apparent that the axis of the knee joint 66 is disposed substantially horizontal or crosswise of the knee joint axis of the inlet section 38, so that the extensible section 68 may swing upwardly and downwardly about the knee joint of the section 66 and may swing horizontally about the knee joint of the section 38.

Corresponding ends of eight rigid tubes are secured internally to the frame 67, two to each of the four sides thereof. Said tubes 73 extend from the frame 67 in a direction away from the twist section 58 and have opposite ends secured to a rectangular frame 74 which is slidably mounted on six tubes 75, corresponding ends of which are secured to a rectangular frame 76 which is slidably mounted on the tubes 73 between the frames 67 and 74. The opposite ends of the tubes 75 are secured to a rectangular frame 77, constituting the opposite end of the extensible section 68 and which is disposed beyond the frame 74.

The corners of the frame 77 are provided with outwardly opening grooves 78 in which portions of a ring 79 slidably engage for swivelly mounting said ring on the frame 77. The ring 79 has oppositely disposed outwardly projecting loops 80 to which the looped ends 81 of the bail 37 are pivotally connected, as seen in Figures 2A and 8.

The frame 77 also forms one end of a third knee section 82 having two knee joint units 41b, which substantially correspond to the knee joint units 41. The bars 42b of the knee joints units 41b are connected to the frame 77 in substantially the same manner that the bars 42 are connected to the frame 39. The other bars 46b are connected to a frame 83, in substantially the same manner that the bars 46 are connected to the frame 40. Two pairs of cables 84 have corresponding ends connected to the inner faces of the longer sides of the frame 77 and other portions of said cables 84 extend slidably through sleeves 85 which are secured to the inner faces of the longer sides of the frame 83. The frame 83 also constitutes one end of the flexible outlet section 86 of the conduit 21. Said outlet section 86 includes six cables 87 corresponding ends of which are secured to inner faces of the frame 83, two to each of the longer sides thereof and one to each of the shorter sides.

A fourth knee section 88 constitutes the outlet end of the flexible outlet end portion 86 and includes an outer frame 89 and an inner frame 90. The frames 89 and 90 are connected by two knee joint units 41c which substantially correspond to the knee joint units 41 and which include bars 46c, corresponding to the bars 46 and which are secured to the inner faces of the shorter sides of the frame 90 and have grooves 51c in which opposite end portions of two of the cables 87 are slidably received. As seen in Figure 10, two pairs of sleeves 91 are secured to the inner face of each of the longer sides of the frame 90. The other four cables 87 extend slidably through four of said sleeves 91 and end portions of four additional cables 92 extend slidably through the other four sleeves 91. The opposite ends of the cables 92 are secured immovably to the frame 89. The ends of the cables 87 and 92 which are disposed beyond but adjacent the frame 90 are provided with weld or soldered tips 93, as best seen in Figure 18, constituting enlargements to prevent said cable ends from being disconnected from the frame 90.

The cables 87, at a plurality of points between the frame 83 and frame 90, are connected to spacers 63 by cotter pins 64, in the same manner as previously described in reference to the twist section 58, to prevent collapsing of the cables 87. A rectangular member 63a, corresponding to a spacer 63, is disposed around the cables 87 between two of the spacers 63. A sleeve 94 is journalled on a long side of the element 63a, as best seen in Figure 14, and a handle 95 is secured to and extends outwardly from the sleeve 94. A long plate 96 is secured adjacent one end thereof to the inner side of the sleeve 94, which sleeve is disposed crosswise of the plate 96. Said plate 96 is disposed between two of the cables 87 and has outturned ends 97. The end portion of the plate 96 which extends the greatest distance from the sleeve 94 is disposed within the conduit portion formed by the cables 87 and passes along the inner side of one of the spacers 63, in a direction toward the knee joint 88. Said plate 96 provides a brake for cans 98 which are fed by gravity through the conduit 21 toward its outlet end 89.

A tubular handle member 99 is fixed to and extends outwardly from the bar 42c of one of the knee joint units 41c, and is located adjacent the outlet end 89 of the conduit 21. As best seen in Figures 16 and 17, a core member 100 is slidably and turnably mounted in the tubular handle 99 and has a pin 101 fixed thereto and extending axially from one end of the core 100 slidably through an opening 102 in the bar 42c, to which the handle 99 is secured. An actuator element 103 is fixed to and extends outwardly from the core 100 and slidably engages a slot 104 formed in a part of the handle 99 and which extends longitudinally thereof and has laterally projecting ends. As seen in Figure 16, it will be readily apparent that the actuator 103 can be moved to one end of the slot 104 to move the pin to a projected position as illustrated and said actuator can be moved circumferentially into one of the notched ends 105 of the slot 104 for locking the pin 101 in a projected position. The actuator can be turned slightly and moved to the other end of the slot 104 and then moved circumferentially into the other notch 105 for latching the pin 101 in a retracted position so that it does not protrude entirely through the opening 102.

The inlet end 39 of the conduit or chute 21 may be supported in any suitable manner but preferably so that the knee joint 47 will be substantially in alignment with the axis 31 about which the boom 29 swings, as illustrated in Figure 1. This can be readily accomplished by a hanger unit 106 including straps 107 having lower portions secured to the long vertical sides of the frame 39, as seen in Figures 1 and 3, and upper portions disposed above said frame 39 which are connected by a cross member 108 which preferably engages on the lower bracket arm 24 for suspending the hanger 106 and the inlet end of the conduit 21 from the bracket 24.

The cans 98 may be supplied in any conventional manner to the inlet end 39 of the conduit or chute 21 and will be disposed in upright positions when entering said chute. The cans 98 will slide or be pushed by other cans through the inlet section 38 and partially through the twist section 58. During passage through the twist section 58 the cans will be turned 90° from upright to horizontal positions by the twist arrangement of the cables 63. Since the chute 21 is inclined downwardly throughout its length from its inlet end, the cans will thereafter roll by gravity to the outlet end 89 of the chute, and it will be understood that the chute 21 is normally filled with cans from end-to-end thereof, or at least from the twist section 58 to the outlet end of the chute.

The flexible can stacker 20 will be manipulated by one operator grasping the handle 99 or the handles 99 and 95. The cans 98 may be stacked from the chute 21 in a conventional container 109 from which the cans may be removed on a removable pallet, not shown, supported in said container, or the cans 98 may be stacked from the chute 21 directly in a vehicle or in a storage enclosure. The operator by grasping the handle 99 may manipulate the outlet end 89 of the flexible conduit portion 86 to cause said portion to swing from left to right and thereafter from right to left, as illustrated in Figures 1 and 2B, as the cans 98 roll from the outlet end 89 and are stacked in superimposed rows or courses. The outlet conduit section 86 can thus be manipulated like a hose to effect this rapid discharge and stacking of the cans 98. The cans may be stacked in rows or courses of substantial length since as the outlet end 89 is swung from left to right, the section 68 thereof can be extended until the frame 76 contacts the frame 74 for laying a course of cans of considerable length. Thereafter as the discharge end 89 is swung back from right to left for stacking another row of cans, the tension exerted on the cable 35 by the balancer 34 will cause the section 68 to return to a retracted position. Also, as the stack rises the outlet end of the conduit is elevated, which requires little manual effort since the balancer 34 is adjusted to substantially counterbalance the entire weight of the conduit 21 and the cans contained therein. In addition, the boom 29 and conduit 21 can be swung through arcs of approximately 180° about the axes 31 and 47, respectively, for stacking cans in any desired direction within an arc of 180°. The knee joints of the other knee sections 66, 82 and 88 allow flexing of the conduit about horizontal axes at three longitudinally spaced points so that guiding of the discharge end 89 can be accomplished by manipulation of the handle 99 with a minimum of effort and a maximum accuracy. It will thus be seen that the flexible can stacker 20 provides an apparatus of extremely simple construction through the use of which cans can be much more quickly and accurately stacked than where other devies such as stacking forks or the like are utilized.

The operator may grasp the handle 95 with his left hand and by exerting a slight downward pressure thereon can swing the lower portion of the brake plate 96 inwardly to restrict a cross sectional portion of the flexible conduit formed by the cables 87 to check the movement of the cans 98 therethrough. In this manner the operator can regulate the rate of flow of cans from the outlet end 89. Passage of the cans from the chute 21 can be stopped at the will of the operator by displacing the stop pin 101 inwardly to its position of Figure 16.

The spacers 63 and their connections to the cables by the cotter pins 64 constitute an important feature of the invention as it prevents collapsing of the cables 87 forming a substantial part of the flexible section 86 and the cables 62, forming the conduit portion of the twist section 58. Without the spacers 63, twisting and bending of the cables of these conduit portions would tend to cause restrictions in the conduit portions in which the cans 98 would become wedged so that a free passage of the cans through the chute or conduit 21 would be prevented.

Various modifications and changes are contemplated and may be resorted to, without departing from the function or scope of the invention as hereinafter defined by the appended claims.

I claim as my invention:

1. A flexible can stacker comprising a flexible chute having an inlet end and an outlet end, said chute being inclined downwardly from the inlet end to the outlet end thereof for the passage of cans therethrough by gravity, and including a flexible portion extending from adjacent the outlet end thereof and by which said outlet end is swingably supported for free swinging movement in any direction for stacking cans in long superimposed rows as the outlet end of the chute is manually swung back and forth, said flexible chute including a plurality of pairs of longitudinally spaced rigid collars, the collars of each pair being longitudinally spaced relative to one another, knee joints connected to and disposed between the collars of each pair of collars, the axis of at least one knee joint being disposed at substantially a right angle to the axis of another knee joint whereby said outlet end of the chute may be swung about said two knee joint axes both horizontally and vertically.

2. A flexible can stacker comprising a flexible chute having an inlet end and an outlet end, said chute being inclined downwardly from the inlet end to the outlet end thereof for the passage of cans therethrough by gravity, and including a flexible portion extending from adjacent the outlet end thereof and by which said outlet end is swingably supported for free swinging movement in any direction for stacking cans in long superimposed rows as the outlet end of the chute is manually swung back and forth, said chute including a twist section located adjacent the inlet end thereof for turning the cans from substantially upright to substantially horizontal positions whereby the cans will roll through the chute toward the outlet end thereof after passing through said twist section, said twist section including flexible cables in which the cans are slidably confined and means connected to the cables to prevent collapse of the twist section.

3. A flexible can stacker as in claim 2, said flexible chute including an extensible section disposed between said twist section and said flexible conduit portion for varying the distance between the inlet and outlet ends of the chute.

4. A flexible can stacker as in claim 3, a first knee joint disposed between said inlet end and the adjacent end of said twist section, a second knee joint disposed between the twist section and extensible section, the chute portions between which the knee joints are disposed including rigid collars to which the knee joints are secured, the axes of said knee joints being disposed at substantially right angles to one another.

5. A flexible can stacker as in claim 4, a third knee joint disposed between said extensible section and said flexible portion of the chute, the axes of said second and third knee joints being disposed substantially horizontal.

6. A flexible can stacker as in claim 5, and a fourth knee joint disposed between the outlet end of the chute and said flexible portion.

7. A flexible can stacker as in claim 6, a handle supported by said fourth knee joint and adapted to be manually engaged and manipulated for manipulating the outlet end of the chute, and stop means slidably supported by said handle and displaceable into said fourth knee joint for stopping the flow of cans to the outlet end.

8. A flexible can stacker as in claim 7, a boom disposed above said flexible chute and having an inner end and an outer end, supporting means supporting said inner end of the boom for swinging movement of the boom about a substantially vertical axis, hanger means connecting the inlet end of the chute to said supporting means for positioning the axis of said first knee joint beneath and nearly in alignment with the axis of swinging movement of the boom, and a cable supported by and depending from the outer end of said boom and connected to the flexible chute between said extensible section and the third knee joint.

9. A flexible can stacker as in claim 8, and means pivotally and swively connecting said cable end to the flexible chute.

10. A flexible can stacker as in claim 9, and a balancer supported by said boom and on which the opposite end of the cable is wound and tensioned, said balancer functioning with the cable to permit swinging movement of the chute toward and away from the boom, for extension and retraction of the chute relative to the boom and for counterbalancing the weight of the chute and the cans supported thereby.

11. In a flexible can stacker, a conduit through which cans are adapted to be conveyed by gravity including an outlet end, a flexible conduit portion extending upwardly from and supporting said outlet end for free swinging movement, said flexible conduit portion comprising rigid rectangular upper and lower end frames, a plurality of flexible cables extending between and connected to said end frames in which the cans are slidably confined, and spacer means disposed between the end frames and connected to the individual cables, said cables and the spacer means constituting the flexible conduit portions disposed between the end frames, and said spacer means preventing collapse of said flexible conduit portion.

12. In a flexible can stacker as in claim 11, said end frames each including oppositely disposed long sides and oppositely disposed short sides, two of said cables being connected to each long side of each end frame and a single cable being connected to each short side of each end frame.

13. In a flexible can stacker as in claim 11, said spacer means including at least one rigid rectangular member surrounding the cables and means connecting each of said cables to said rectangular member.

14. In a flexible can stacker as in claim 11, a manually actuated brake means supported by said cables including a swingably mounted handle disposed externally of the cables and a brake plate fixed to said handle and extending therefrom toward said outlet end and disposed within a part of the conduit formed by the cables and being swingably movable inwardly of said conduit portion by manipulation of the handle for checking or stopping the movement of cans therethrough toward said outlet end.

15. In a flexible can stacker as in claim 11, a handle supported by said conduit adjacent said outlet end and adapted to be manually actuated for manipulating the outlet end of the conduit, and stop means reciprocably supported by said handle and movable into the conduit to obstruct the flow of cans to said outlet end.

16. In a flexible can stacker including a flexible conduit having an inlet end and an outlet end, said outlet end being disposed below the inlet end, a twist section forming a part of said flexible conduit and including rigid end portions and rigid connecting means extending between and connected to said end portions, a plurality of flexible cables connecting said rigid end portions and defining a twisted conduit portion, and spacer means supported by said cables, between said rigid end portions, and connected to each of the cables to prevent collapsing of the cables.

17. In a flexible can stacker as in claim 16, a first knee joint interposed between and connecting one end of the flexible twist section to said inlet end of the conduit, a second knee joint connecting the opposite end of the twist section to another portion of said flexible conduit, the axes of said knee joints being disposed at right angles to one another, said knee joints having portions connected to the rigid end portions of the twist section, said inlet end and said other portion of the flexible conduit each including a rigid part to which a knee joint portion is connected.

18. In a flexible can stacker as in claim 17, a part of one rigid end portion of the twist section being swivelly mounted in another part thereof whereby said conduit portion of the twist section may be twisted in either direction.

References Cited in the file of this patent

UNITED STATES PATENTS

| | | |
|---|---|---|
| 2,032,258 | Caton | Feb. 25, 1936 |
| 2,576,991 | Bainbridge et al. | Dec. 4, 1951 |
| 2,662,631 | Kraus et al. | Dec. 15, 1953 |
| 2,720,302 | Madden | Oct. 11, 1955 |